United States Patent [19]

Kabil

[11] 3,886,041

[45] May 27, 1975

[54] PRODUCTION OF CITRIC ACID BY SUBMERGED FERMENTATION

[75] Inventor: Adel J. Kabil, Vienna, Austria

[73] Assignee: Aktiengesellschaft Jungbunzlauer Spiritusund Chemische Fabrik, Vienna, Austria

[22] Filed: Aug. 17, 1972

[21] Appl. No.: 281,368

[30] Foreign Application Priority Data
Aug. 18, 1971 Austria..................................... 7219

[52] U.S. Cl..................... 195/36 R; 195/47; 195/48
[51] Int. Cl............................................... C12d 1/04
[58] Field of Search .................... 195/47, 36, 28, 48

[56] References Cited
UNITED STATES PATENTS
3,335,067   8/1967   Batti................................. 195/36 R
3,689,359   9/1972   Fukuda et al..................... 195/28 R FOREIGN PATENTS OR APPLICATIONS
572,383   10/1945   United Kingdom............... 195/36 R Primary Examiner—David M. Naff
Assistant Examiner—Thomas G. Wiseman
Attorney, Agent, or Firm—Browne, Beveridge, Degrandi & Kline

[57] ABSTRACT

A method of increasing the yield of citric acid produced by the fermentation of carbohydrates by Aspergillus. The method comprises adding sodium hydroxide to the fermentation medium in sufficient amounts to maintain the pH between 1.5 and 2.0. The first addition of sodium hydroxide is made 24 to 36 hours after inoculation.

3 Claims, No Drawings

PRODUCTION OF CITRIC ACID BY SUBMERGED FERMENTATION

The invention relates to a process for the production of citric acid by submerged fermentation of a carbohydrate-containing material by means of the fungus Aspergillus niger, with the addition of an alkaline substance.

It is known, that for the production of citric acid by the surface-fermentation process, sodium hydroxide is added to the fermentation medium.

There are, however, several serious disadvantages to the above mentioned surface-fermentation process, e.g., a large floor space is required, the control of oxygen transfer is insufficient and, especially, the optimal control of the fermentation can not be achieved with this process. Moreover, in the surface-fermentation process the danger of infection is more acute than in the submersed fermentation process, and the process-control of the fermentation is much more complicated and more difficult to follow.

Due to these disadvantages, the submerged fermentation process for the production of citric acid was developed some years ago. In this process a suitable liquid fermentation medium, consisting of a carbohydrate-containing material and various nutrients, is fermented after inoculation with the spores of a microorganism. In this submerged fermentation process, a nitrogen-containing nutrient, e.g., ammonia, was frequently added to the fermentation medium to control the fermentation as it is described for example in the specification of the Canadian Pat. No. 642.926.

Object of the invention is to provide a process which is free of the above mentioned disadvantages, and allows optimal fermentation control in the submerged process.

According to the invention, this is achieved in a process as it is mentioned in the introduction, by adding to the fermenting medium, containing at least partially purified carbohydrates, for example sugar, purified by ion exchange, sodium hydroxide as an alkaline substance, optionally in portions, whereby the first addition is made, preferably 24 to 36 hours, after inoculation, in order to control the mycelium growth.

The addition of sodium hydroxide after inoculation causes a stimulation of the citric acid production, and at the same time allows exact control of the process.

It was also found, that addition of sodium hydroxide after inoculation makes it unimportant, to adjust the alkali metal/phosphate ratio to specific values.

According to a preferred embodiment of the present invention, the first addition of sodium hydroxide is made 30 hours after inoculation.

The addition at the above mentioned time promotes the development of a mycelium, which is capable of an increased citric acid production, thereby decreasing the time of fermentation. Further, it was shown to be an advantage to add sodium hydroxide throughout the fermentation period in order to maintain the pH of the fermenting medium between 1.5 and 2.0, preferably between 1.8 and 2.0. Thereby the formation of undesirable acids is almost completely suppressed.

EXAMPLE 1:

A decationized sugar solution with a sugar content of 25,2 percent (weight/volume) was sterilized for 30 min in streaming steam and cooled down to 35°C. Six sterilized glass fermenters with a diameter of 150 mm and a height of 1 000 mm were each charged with 11 litres of the above mentioned solution, and the temperature adjusted to 30°C. To each fermenter was added a piece of stainless steel of the type DIN 4586 of the following composition:

C ≤ 0,07 percent, Si ≤ 1 %, Mn = 2 percent,
Cr 18 percent, Mo 2,75 percent. Ni 22 percent, Cu 2 percent, Nb ≥ 0,56 percent.

Before the fermentation was started, the following nutrient salts were added to the aerated sugar solution:

| | | |
|---|---|---|
| 6 | g/l | $(NH_4)_2SO_4$ |
| 1,1 | g/l | $MgSO_4.7H_2O$ |
| 0,55 | g/l | $CaCl_2.2H_2O$ |
| 0,15 | g/l | NaCl |
| 0,15 | g/l | $KH_2PO_4$ |
| 0,0015 | g/l | $ZnSO_4.7H_2O$ |

After initial adjustment of the pH to 2,90 and addition of $K_4[Fe(CN)_6].3H_2O$ as an inhibitor, the solution was inoculated with spores of Aspergillus niger. Throughout the fermentation period the temperature was kept at 30°C, and further portions of $K_4[Fe(CN)_6].3H_2O$ were added to a total concentration of 10 ppm. After 30 hours 40 ml NaOH (16 percent by weight) were added to three fermenters, and further amounts of NaOH were added as required. The pH is adjusted to 1.9. The amount of citric acid formed, the fermentation yield and the fermentation period were measured. The improved results as compared to the samples without addition of sodium hydroxide are shown in the following table:

Table

| No. of sample | Addition of NaOH | Fermentation period (days) | Citric acid-monohydrate (g) | Yield (%) |
|---|---|---|---|---|
| 106 | − | 12 | 2320 | 83,7 |
| 107 | − | 12 | 2299 | 82,9 |
| 108 | − | 11 | 2318 | 83,6 |
| 112 | + | 9½ | 2475 | 89,3 |
| 113 | + | 10 | 2414 | 87,1 |
| 114 | + | 9 | 2489 | 89,8 |

EXAMPLE 2:

As described in the above example three glass fermenters were charged with a decationized sugar solution of a concentration of 25,2 percent (weight per volume), the solution was sterilized and the nutrient salts mentioned in example 1 were added, however without adding a piece of stainless steel. The fermentation was carried out with additions of NaOH in the same way as described in example 1. The results are shown in the following table:

| No. of sample | Addition of NaOH | Fermentation period (days) | Citric acid-monohydrate (g) | Yield (%) |
|---|---|---|---|---|
| 121 | + | 8½ | 2492 | 89,9 |
| 122 | + | 9 | 2553 | 92,1 |
| 123 | + | 8 | 2550 | 92,0 |

I claim:

1. In a process for the production of citric acid which comprises the submerged fermentation of a carbohydrate containing material by means of the fungus Aspergillus niger with the addition of an alkaline substance the improvement which comprises added sodium hydroxide to the fermenting medium in portions for maintaining the pH value of the fermentation medium at a value between 1.5 and 2.0, whereby the first addition is made at a time 24 to 36 hours after inoculation.

2. A process according to claim 1 wherein the pH value of the fermentation medium is maintained at a value of between 1.8 and 2.0 and the first addition is made at a time 30 hours after said inoculation.

3. A process according to claim 1 wherein the carbohydrate is sugar.

* * * * *

UNITED STATES PATENT OFFICE
CERTIFICATE OF CORRECTION

PATENT NO. : 3,886,041
DATED : May 27, 1975
INVENTOR(S) : ADEL J. KABIL

It is certified that error appears in the above-identified patent and that said Letters Patent are hereby corrected as shown below:

IN THE HEADING:

Please correct the name of the assignee as follows:

-- Aktiengesellschaft Jungbunzlauer Spiritus- und chemische Fabrik --

Signed and Sealed this twenty-eight Day of October 1975

[SEAL]

Attest:

RUTH C. MASON
*Attesting Officer*

C. MARSHALL DANN
*Commissioner of Patents and Trademarks*